Feb. 27, 1968  N. G. PETROS  3,370,380
SHUTTER OPERATING APPARATUS FOR AN OBSERVATORY DOME
Filed June 30, 1965  4 Sheets-Sheet 1

INVENTOR.
NICHOLAS G. PETROS
BY Hamilton D Cook
ATTORNEYS

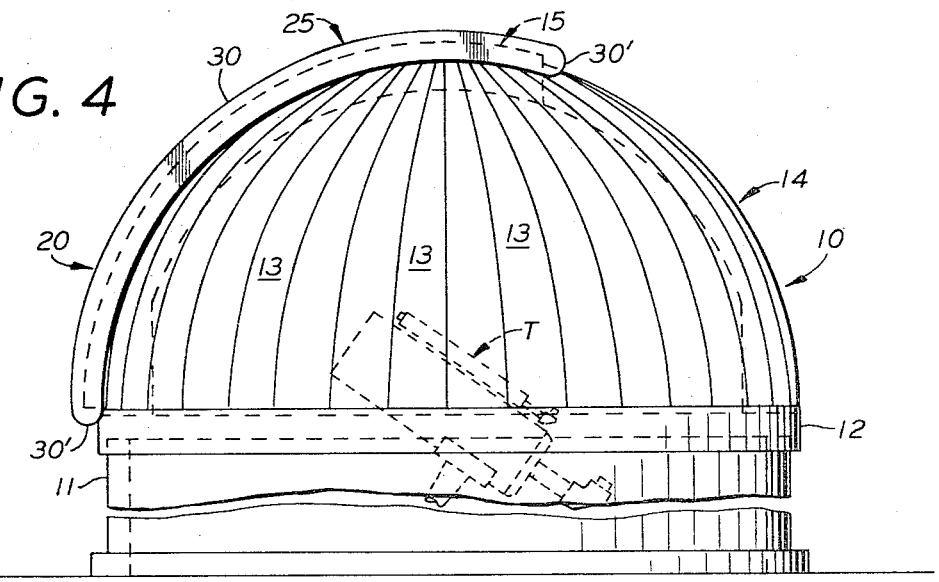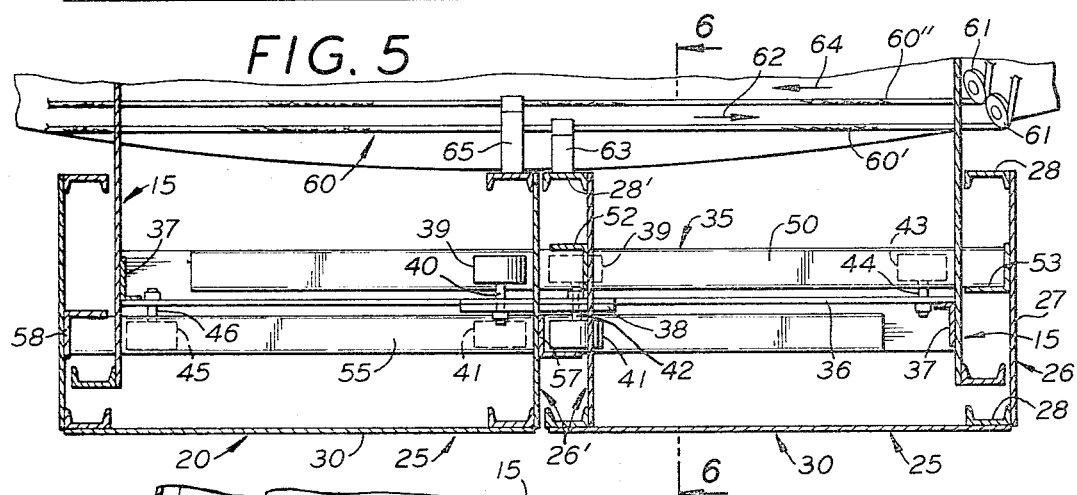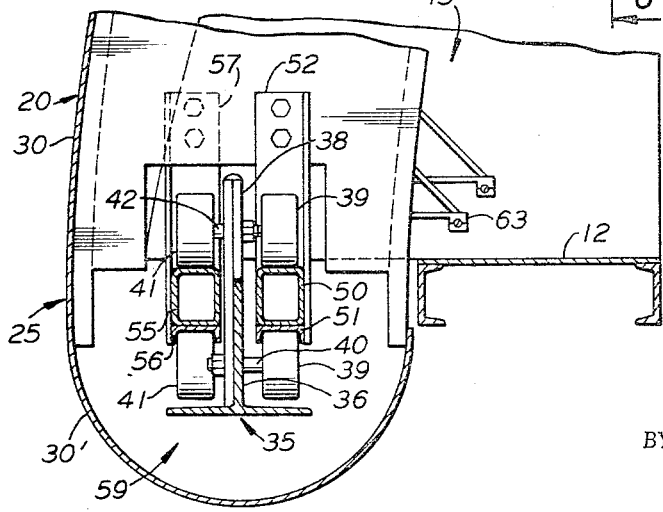

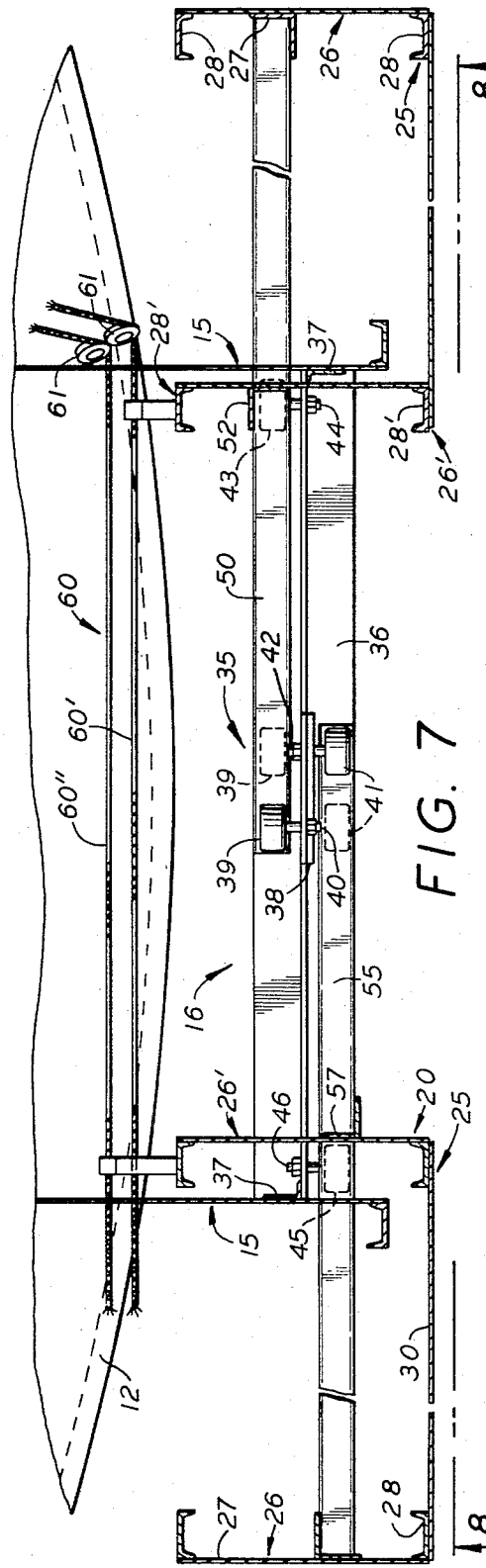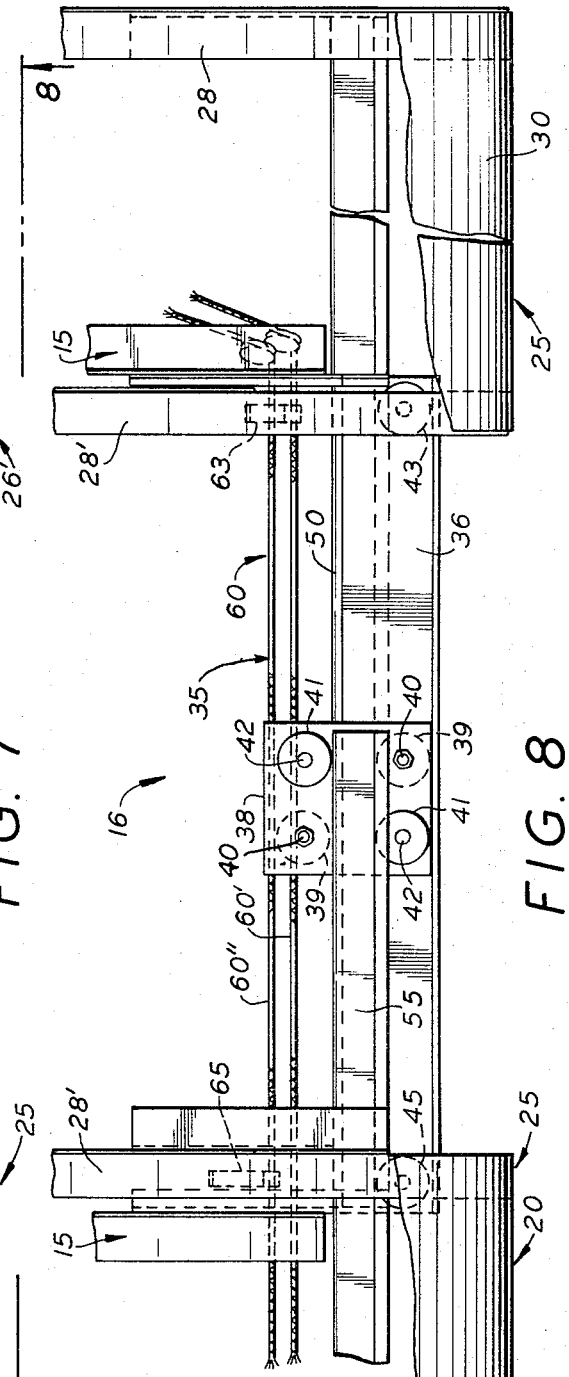

INVENTOR.
NICHOLAS G. PETROS
BY Hamilton D Cook
ATTORNEYS

United States Patent Office 3,370,380
Patented Feb. 27, 1968

3,370,380
SHUTTER OPERATING APPARATUS FOR AN OBSERVATORY DOME
Nicholas G. Petros, North Canton, Ohio, assignor to Astro-Tec Manufacturing, Inc., Canal Fulton, Ohio, a corporation of Ohio
Filed June 30, 1965, Ser. No. 468,351
6 Claims. (Cl. 49—40)

ABSTRACT OF THE DISCLOSURE

A bi-parting shutter operating apparatus for an observatory dome having a viewing aperture defined by meridional mullions with a transom spanning the mullions, a plurality of bearing rollers carried by the transom, and a translating track attached to each of the shutters and extensible into the other of the shutters and movably supported by the bearing rollers, thereby providing shutter operating apparatus which is totally contained within the shutters in a closed position to eliminate weather exposure and minimize wind loading and aerodynamic lift.

---

The present invention relates to observatory domes for astronomical observatories, space satellite tracking stations, and other similar astronomical purposes. More particularly, the invention relates to observatory domes having a bipartite shutter assembly for closing a dome aperture through which a telescope or other astronomical instrument may be aimed.

Observatory domes of the character contemplated are generally hemispherical or semispherical in shape and are usually mounted for selective powered revolution on the observatory building. Thus, the aperture shutter and its associated operating mechanism must be carried by the dome for rotation with it. Moreover, observatories are often situated in remote locales and in mountainous regions where ambient wind, snow, and general weather conditions are severe, thereby imposing substantial mechanical stresses and loading upon the dome and shutter structure.

Certain prior art observatory dome constructions have embodied shutters which are opened and closed by movement in a generally meridional direction; that is, by elevating the shutter up and over the top of the dome. However, such domes utilize trough-type trackways or rails which are partially exposed when the shutters are closed over the dome aperture. Snow, ice, sand, and other foreign debris collects in these trough-like trackways or rails, creating maintenance problems in operating the shutters and often completely obstructing opening travel. Furthermore, owing to the necessity for supplying energy sufficient for lifting the entire weight of the shutter up and over the dome azimuth during opening, substantial horsepower and strength of materials criteria are imposed upon the shutter drive mechanisms for reasonably rapid opening-time requirements, and manual operation is virtually impossible. Since the heavy-duty shutter drive mechanism must be carried by the rotating dome, and since heavier structural members must be utilized in certain of the dome arches to support the weight of the vertically movable shutter and its tracks, the dome rotation drive requirements are commensurately increased.

Other prior art conservatory dome constructions have employed biparting shutters laterally shiftable for opening by means of trolley wheels or the like riding in trough-like tracks or rails forming strut-like members extending outwardly from the meridional extremities of the dome aperture. However, these types of domes are likewise subject to collection of snow, ice, and foreign debris in the exposed shutter trackways or troughs, with the attendant problems in maintenance and operation of the shutters. More recently, it has been proposed that such problems be alleviated by incorporating an integral track cover canopy protruding from each outer corner of the dome shutters. However, these canopy protuberances significantly increase the surface area of the dome shutter, thereby amplifying the adverse effects of wind loading in terms of structural stresses developed in the dome and shutters and resistance to shutter opening and closing operations. Moreover, such protuberances constitute objectionable esthetic or architectural defects.

It is, therefore, a general object of the present invention to provide an improved observatory dome construction having improved operational efficiency and reliability.

It is a further object of the present invention to provide an improved observatory dome shutter construction having an improved shutter operation carriage.

It is a further object of the invention to provide an improved shutter construction having efficient and reliable carriage and drive means which may be operated conveniently either manually or by power.

It is a still further object of the present invention to provide an improved bipartite shutter construction wherein the associated carriage or track and drive telescope are within the interior of the shutters and are shielded from the deleterious effects of ambient weather conditions.

It is another object of the invention to provide an improved observatory dome bipartite shutter construction having streamlined exterior surfaces, without track strut or track canopy protuberances or the like, to reduce the static and dynamic wind loading and resistance thereon.

It is still another object of the invention to provide improved shutter carriage means which may be adapted to use in existing observatory domes.

It is yet another object of the invention to provide relatively movable shutters for enclosing an observatory dome aperture defined by generally meridional mullions including a transom spanning the mullions, bearings journaled on the transom, a pair of tracks translatably carried by the bearings and attached to one or the other of the shutters, each shutter being adapted to receive tracks to which it is not attached in telescoping interrelation during shutter closure, and streamlined meridional and lateral peripheries on the exterior surfaces of the shutters.

Other objects and advantages of the present invention will be apparent from the accompanying drawings and following detailed description of a preferred embodiment of the invention, it being understood that variations, changes, and substitution of equivalent components and structural details are comprehended within the scope and spirit of the invention.

In the drawings, in which like reference characters designate like assemblies and parts throughout:

FIG. 4 is a side elevational view of the observatory dome according to the present inveniton, an astronomical telescope (T) being depicted therein environmentally by phantom lines;

FIG. 5 is a plan sectional view, taken along lines 5—5 in FIG. 2, with the shutters in closed position;

FIG. 6 is an enlarged elevational sectional view taken on lines 6—6 in FIG. 5;

FIG. 7 is a plan sectional view, similar to the view of FIG. 5, but with the shutters in open position;

FIG. 8 is an elevational sectional view at lines 8—8 in FIG. 7; and

Figure 3:
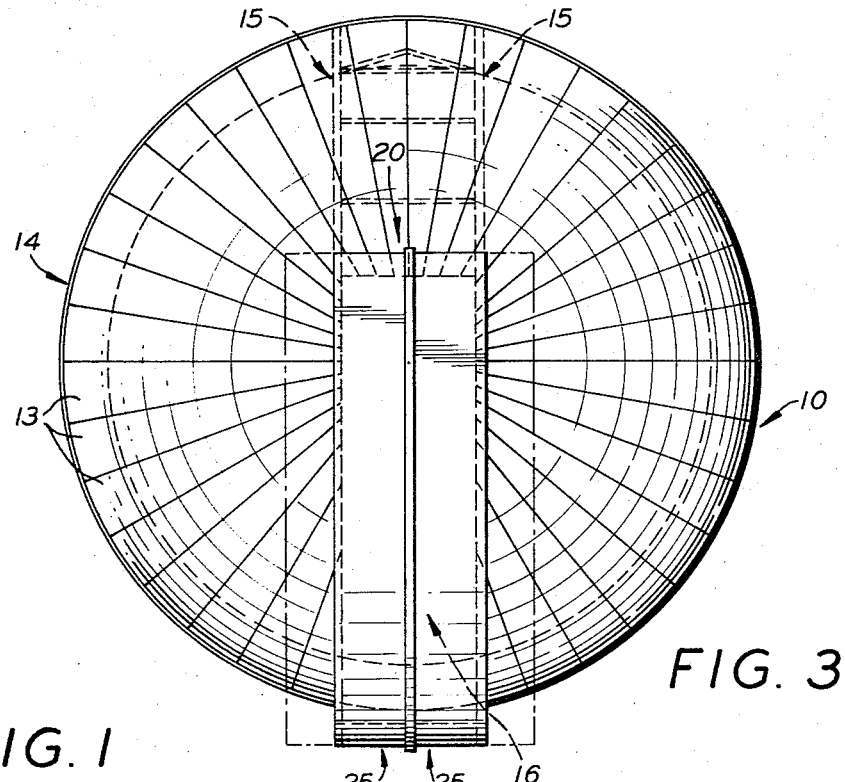
FIG. 3 is a plan view of the dome and shutter construction shown in FIG. 2.
Figure 1:
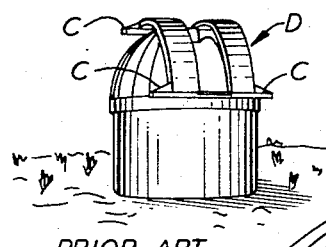
FIG. 1 is a perspective view of a prior art observatory dome (D) having biparting shutters, strut-like tracks cantilevered or protruding from the dome aperture, and track canopy protuberances (C) at the outer corners of the shutters, all as described in the foregoing preamble (for further details of such construction, reference may be made, for example, to U.S. Patent No. 2,966,844)
Figure 2:
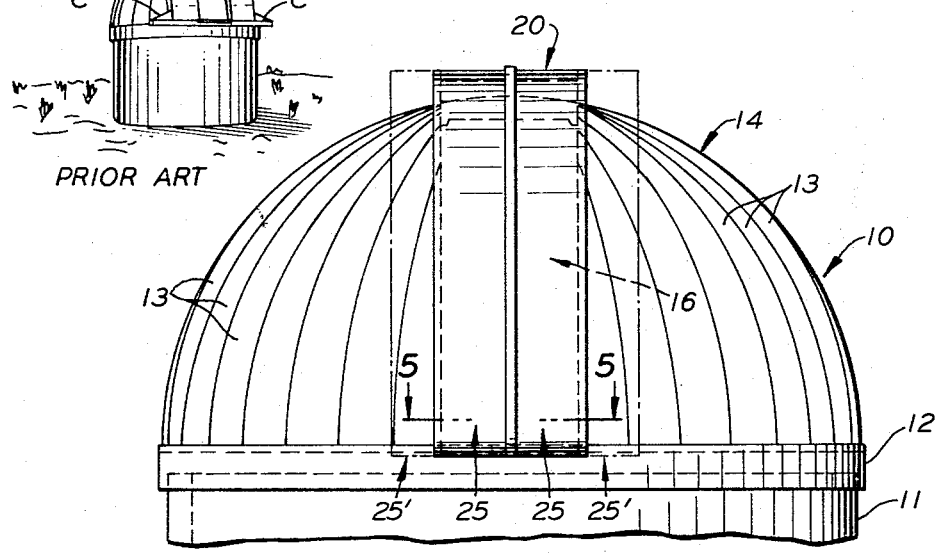
FIG. 2 is a partial front elevational view of an observatory or space satellite tracking station, having an improved dome and shutter construction according to the present invention, the chain-lines illustrating the open position of the shutters.

Referring to FIGS. 2, 3, and 4, an observatory dome structure 10, according to the present invention, generally comprises a stationary foundation wall 11 of masonry or the like, upon which a generally cylindrical dome pediment skirt 12 is mounted for rotation by conventional weight-bearing rollers and drive means (not shown). The dome proper may be constructed of curved segments or gores 13 of galvanized steel, aluminum, copper, Fiberglas or other suitable material, the gores 13 being supported by arches or other suitable structural members (not shown) and being joined to form a hemispherical or semispherical dome cover assembly 14.

A pair of main arches or generally meridionally extending mullions 15 bridge the center of the dome 10, the space between the mullions 15 not being covered by gores 13, from one side of the pediment skirt 12 up and over the dome to a point somewhat beyond the dome azimuth, so as to define an aperture 16 through which a telescope T or similar astronomical instrument may be sighted.

An improved biparting shutter assembly 20 is mounted on the dome structure 10 and is arranged for lateral parting movement for selectively opening and closing the dome aperture 16. The shutter assembly 20 comprises a pair of generally rectangular curved shutters 25, the shutters being sealed at all joints and mating edges by conventional weather seals (not shown) and having streamlined exterior surfaces, peripheries, and extremities. as hereinafter explained. The shutter "open" position is illustrated in FIG. 2 by the numeral 25'.

Referring generally to FIGS. 5 through 9 inclusive, each shutter 25 comprises at least two generally meridionally extending curved stile members 26, which, for example, may be fabricated from arches 27 of curved flat steel plates reinforced at the lateral edges thereof by a pair of similarly curved channel irons 28 welded thereto. The stile members 26 are preferably transversely reinforced and joined by a plurality of lateral framing members 29 which may be of flat steel or band iron. The exterior shutter surface thus defined by the superstructure of the stile members 26 and the framing members 29 is enclosed by a suitable cover skin 30 of galvanized steel, aluminum, copper, Fiberglas or other suitable material, preferably the same material as used for the dome gores 13. The cover skin 30 is closely fitted to the shutter superstructure and is rolled or curved in a smooth and streamlined radius at the meridional extremities 30' in order to minimize aerodynamic resistance and lifting tendencies due to wind loading. Such adverse aerodynamic and wind loading effects tend to negate the effectiveness of the shutter weather seals and produce excess structural stress and mechanical loading on the dome and shutter operation means. These deleterious effects are further minimized by the elimination of track projections and canopy cover protuberances made possible by the novel shutter carriage construction hereinafter described.

Referring to the plan sectional view of FIG. 5, the shutters 25 are shown in the closed position wherein the aperture 16 defined by the mullions 15 is enclosed, and the inner shutter still members 26' are in abutting or mating engagement generally along the longitudinal centerline of the aperture.

The biparting shutters 25 are mounted on carriage assemblies 35 located along the top and bottom borders of the dome aperture 16 and are arranged for lateral translation during opening and closing movements. While the following detailed description of a carriage assembly 35, and the several views thereof in the drawings, are of the bottom carriage assembly, it will be understood that the top or upper carriage assembly 35 is preferably substantially identical in construction and operation.

A shutter carriage assembly 35 is carried on a transom member 36, preferably a T-bar, or a fabricated T-section, which laterally spans and is joined as by angle irons 37 with the generally meridional mullions 15, near the lower extremity thereof and radially outwardly of the cylindrical dome pediment skirt 12.

The transom member T-bar 36 has a gusset plate welded or attached thereto, generally medially thereof, to form a generaly rectangular journal plate portion 38 therein. Located on the side of the rectangular journal plate portion 38 which is radially inward with respect to the dome are a pair of track bearing rollers 39, each journaled as by bolt axle 40 secured to the journal plate portion 38 at diagonal corners thereof. Similarly, on the radially outer side of the journal plate portion 38, and at the other diagonal corners thereof, a pair of rollers 41 are journaled by bolt axles 42. Additionally, a radially inwardly oriented idler roller 43 is preferably journaled by bolt axle 44 located on the upstanding or vertical web of the T-bar transom member 36 near the right hand end thereof. Similarly, a radially outwardly oriented idler roller 45 on a bolt axle 46 may be located near the left hand end of the T-bar transom member 36.

A first translating track 50 is movably mounted inwardly of the upstanding web of the T-bar transom 36 and between bearing rollers 39 and on idler roller 43 for linear translation therealong during opening and closing of the right hand shutter 25. As shown, the translating track 50 may be formed from a length of rectangular steel tubing, and it preferably has a guide flanged member or channel iron 51 welded to its under side. The guide channel 51 rides on the lower one of rollers 39 and on roller 43 to maintain alignment of the shutter during opening and closing translation thereof. The translating track 50 is attached to the right hand shutter 25, for movement therewith, as by an angle iron bracket 52 at the inner shutter stile 26' and by an angle iron bracket 53 at the interior surface of the outer shutter stile 26.

Similarly, for the left hand shutter 25, a second translating track 55 is movably mounted outwardly of the upstanding web of the T-bar transom 36 and between bearing rollers 41 and on idler roller 45 for linear translation therealong during opening and closing of the left hand shutter 25. Again, the track 55 is preferably formed from a length of rectangular steel tubing with a guide channel iron 56 welded onto the underside to cooperate with rollers 41 and the roller 45 to maintain shutter alignment. The translating track 55 is attached to the left hand shutter 25 for movement therewith as by an angle iron bracket 57 at the inner shutter still 26' and by an angle iron bracket 53 at the interior surface of the outer shutter stile 26.

Figure 9:
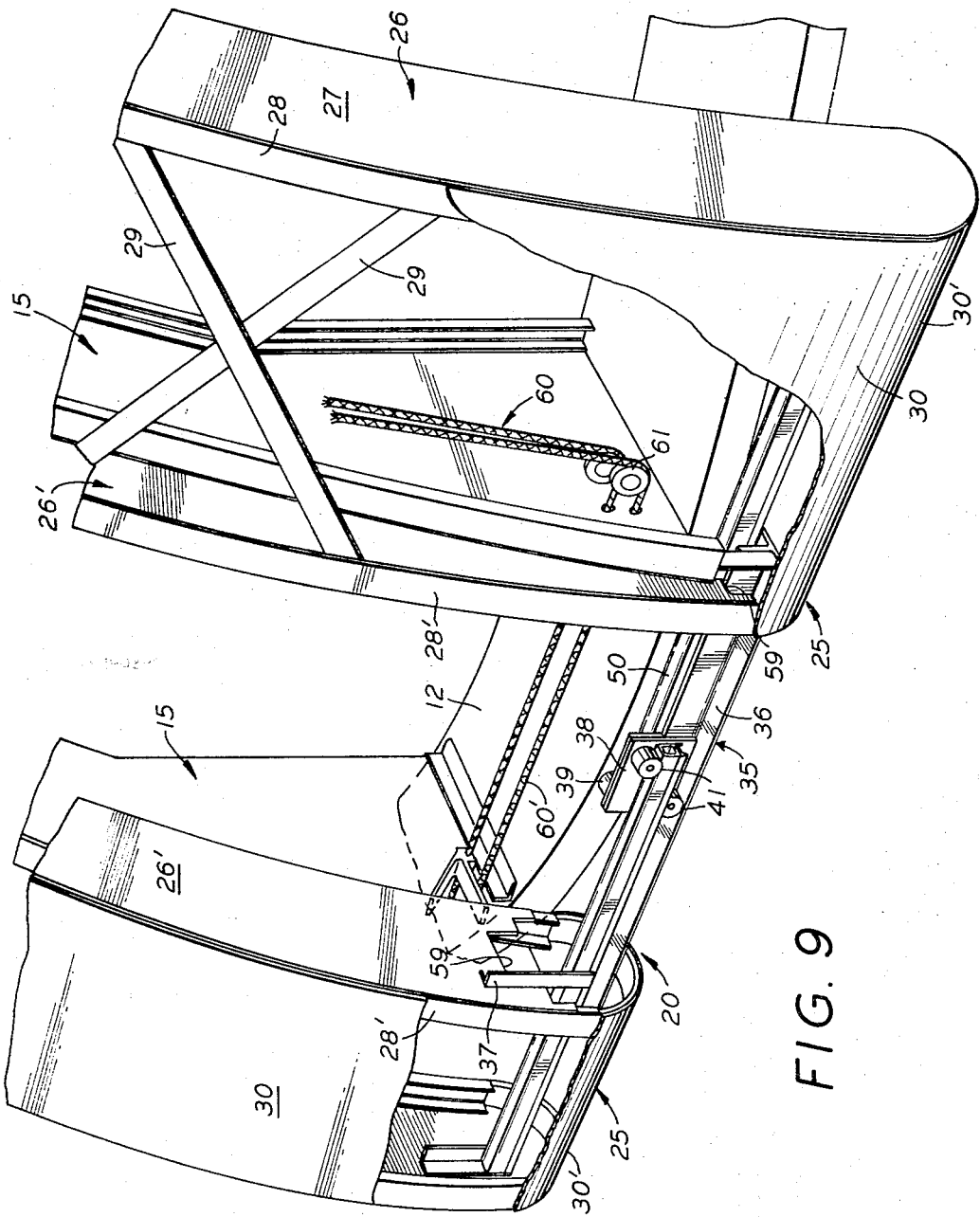
FIG. 9 is an isometric view of the shutters in the open position of FIGS. 7 and 8, portions of the shutter cover skin being broken away for purposes of illustration.

As best shown in FIGS. 6 and 9, lower end portions of each of the inner or mating stiles 26' of the right and left hand shutters are cut out to form a tunnel, indicated generally by the numeral 59. These tunnels 59 provide clearance so that the translating track 50 for the right hand shutter may telescope into the interior of the left hand shutter during closing. Similarly, the translating track 55 for the left hand shutter telescopes into the interior of the right hand shutter during closing.

Each of the meridional mullions 15 is preferably foreshortened or notched out at its lower end to provide the clearance for tunnel 59.

The shutters 25 on the shutter carriage assembly 35 are preferably driven by parallel portions of an endless winch cable 60 entrained over sheaves 61 and powered by a suitable reversible electric motor and gear reducer or a hand winch (not shown). As shown in FIG. 5, cable portion 60' of the endless winch cable 60 moves to the right in the direction of arrow 62 during shutter opening; and the right hand shutter is thus pulled open by being attached to cable portion 60' as by a clamp 63 attached to the radially inner curved channel 28' of inner stile member 26' of the right hand shutter. Similarly, winch cable portion 60", which moves in the direction of arrow 64 during shutter opening, pulls open the left hand shutter by virtue of the attached clamp 65 which is attached to the inner stile 26' of the left hand shutter. The cable portions extending beyond the sheaves 61 are connected and pass over a terminal pulley (not shown).

Conversely, reverse travel of the parallel portions of the endless winch cables 60 effects shutter closing. The direction of travel of the cable 60 is, of course, preselected by appropriate actuation of the conventional reversible motor or power source for the winch. Also, the winch may be adapted for selective manual or motor operation.

It is apparent from the foregoing detailed description and illustration of one preferred embodiment of the invention that the stated objects, purposes, and advantages of the invention may be attained by the invention described herein. However, reasonable and obvious equivalents and variants will occur to those skilled in the art. It is, therefore, appropriate and proper that the present invention be measured solely by the appended claims.

What is claimed is:

1. A pair of cooperating shutters for enclosing the aperture of a semispherical observatory dome having transom means, each said shutter comprising; at least two meridionally curved stile members, framing members laterally connecting said stile members and covered by a skin to define an exterior surface, said exterior surface having curved streamlined surfaces at its meridional extremities, and translating track means extending laterally of one of said stile members and movably mounted on said transom means interiorly of the exterior surface of each said shutter for telescoping movement into the other of said shutters during closure of said aperture.

2. In a semispherical observatory dome having an aperture defined by a pair of generally meridional mullions and having a pair of shutters, each said shutter formed by a cover skin over laterally connected inner and outer generally meridional stiles, said inner stiles of each said shutter mated when said shutters are closed, apparatus for opening and closing said shutters comprising; a T-bar transom member spanning the lower ends of said mullions, a gusset plate member attached to the vertical web of said T-bar medially thereof to form a journal plate portion, rollers journalled in said gusset plate portion, a traverse track attached to each said shutter and movably carried by said rollers, and a tunnel through each said mullion and inner stile to receive each said traverse track in telescoping interrelation and interiorly of said shutters.

3. In a semispherical observatory dome, according to claim 2, said apparatus further comprising; an endless winch cable entrained over pulley sheaves and extending around the periphery of said aperture, and a clamp attached to each said inner stile of each said shutter and to said cable whereby selective movement of said cable in opposite directions over said pulley sheaves selectively opens and closes said shutters.

4. In an observatory dome having a pair of relatively movable shutters for enclosing an aperture defined by generally meridional mullions, a shutter carriage comprising; transom means spanning said mullions, bearing means carried by said transom means, and translating track means attached to one of said shutters and extensible into the other of said shutters and movably carried by said bearing means, whereby the shutter carriage is totally contained within the shutters in a closed position to eliminate weather exposure and minimize wind loading and aerodynamic lift.

5. Apparatus according to claim 4, wherein said bearing means comprise a plurality of rollers mounted on said transom means and wherein said translating track means comprise tubular members having channels thereon providing guide raceways for said rollers.

6. Appartus according to claim 4, wherein said transom means comprises a T-bar member having a vertical web which extends between said translating track means.

References Cited
UNITED STATES PATENTS

| | | | |
|---|---|---|---|
| 535,990 | 3/1895 | Lowe | 52—65 X |
| 1,767,703 | 6/1930 | Rusch | 49—166 |
| 3,245,178 | 4/1966 | Clark | 49—123 |

JOHN E. MURTAGH, *Primary Examiner.*

UNITED STATES PATENT OFFICE
CERTIFICATE OF CORRECTION

Patent No. 3,370,380                        February 27, 1968

Nicholas G. Petros

It is certified that error appears in the above identified patent and that said Letters Patent are hereby corrected as shown below:

Column 2, line 61, "2,966,844" should read -- 2,996,844 --. Column 3, line 38, "extremities." should read -- extremities, --; line 70, "still" should read -- stile --. Column 4, line 15, "generaly" should read -- generally --; line 56, "still" should read -- stile --.

Signed and sealed this 10th day of February 1970.

(SEAL)
Attest:

Edward M. Fletcher, Jr.                    WILLIAM E. SCHUYLER, JR.
Attesting Officer                              Commissioner of Patents